(12) United States Patent
Kobayashi et al.

(10) Patent No.: US 8,520,261 B2
(45) Date of Patent: Aug. 27, 2013

(54) CONTROLLER AND HALFTONE DOT SIGNAL GENERATING METHOD CAPABLE OF CONTROLLING GLOSSINESS OF IMAGE

(75) Inventors: Shinya Kobayashi, Kanagawa (JP); Kentarou Matsumoto, Tokyo (JP); Akio Tsujita, Kanagawa (JP); Masato Iio, Kanagawa (JP); Tadashi Kasai, Kanagawa (JP); Katsuhiro Shinohara, Kanagawa (JP); Masakazu Terao, Kanagawa (JP); Yoshihiro Sonohara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 13/282,976

(22) Filed: Oct. 27, 2011

(65) Prior Publication Data
US 2012/0105915 A1     May 3, 2012

(30) Foreign Application Priority Data

| Oct. 28, 2010 | (JP) | ................................. 2010-242032 |
| Jun. 2, 2011 | (JP) | ................................. 2011-124067 |
| Oct. 6, 2011 | (JP) | ................................. 2011-221859 |

(51) Int. Cl.
  *H04N 1/405*     (2006.01)
(52) U.S. Cl.
  USPC ......... 358/3.06; 358/3.03; 358/3.08; 358/3.1; 358/534; 358/536
(58) Field of Classification Search
  None
  See application file for complete search history.

(56) References Cited

U.S. PATENT DOCUMENTS

| 7,497,540 | B2* | 3/2009 | Mizutani et al. ................. 347/15 |
| 7,877,053 | B2* | 1/2011 | Ng et al. ......................... 399/341 |
| 7,965,961 | B2* | 6/2011 | Priebe et al. ................... 399/231 |
| 8,031,371 | B2* | 10/2011 | Ohta et al. ...................... 358/2.1 |
| 8,376,502 | B2* | 2/2013 | Ochiai et al. .................... 347/19 |
| 2005/0185008 | A1* | 8/2005 | Couwenhoven et al. ....... 347/14 |
| 2006/0133870 | A1* | 6/2006 | Ng et al. ......................... 399/341 |
| 2009/0154948 | A1* | 6/2009 | Cahill et al. .................... 399/69 |
| 2009/0207429 | A1* | 8/2009 | Iguchi ............................. 358/1.9 |
| 2010/0195126 | A1* | 8/2010 | Shiozawa ....................... 358/1.9 |
| 2010/0238509 | A1* | 9/2010 | Ogawa ........................... 358/3.06 |
| 2012/0063819 | A1* | 3/2012 | Kasai et al. .................... 399/298 |

FOREIGN PATENT DOCUMENTS

| JP | 4-362960 | 12/1992 |
| JP | 5-27539 | 2/1993 |
| JP | 9-200551 | 7/1997 |
| JP | 11-44980 | 2/1999 |
| JP | 2001-109208 | 4/2001 |
| JP | 2007-163902 | 6/2007 |
| JP | 2009-282499 | 12/2009 |

OTHER PUBLICATIONS

"Specular glossiness—Methods of measurement", Japanese Standards Association, Japanese Industrial Standard, Japanese Industrial Standards Committee, JIS Z 8741, 1997, 25 pages.

* cited by examiner

*Primary Examiner* — Dung Tran
(74) *Attorney, Agent, or Firm* — Oblon, Spivak, McClelland, Maier & Neustadt, L.L.P.

(57) ABSTRACT

An image glossiness controller has a main component color specifying unit that identifies a prescribed component color and output identification information thereof. A change in amplitude of a convexoconcavity of a toner layer of the prescribed component color is greatest among those of the other component colors when each of the component color toner is formed and fixed alone. Three or more halftone dot signal generators convert clear toner image information into three or more binary clear toner image signals corresponding to three or more component colors per component color pixel using multiple halftone dot characteristics, respectively. Each of the multiple halftone dot characteristics generating three or more binary clear toner image signals has a reversed phase from that generating three or more binary component color image signals.

18 Claims, 13 Drawing Sheets

501
| 8 | 9 | 11 | 11 |
|---|---|----|----|
| 9 | 10 | 10 | 11 |
| 9 | 10 | 11 | 10 |
| 10 | 11 | 10 | 9 |

502
| 10 | 0 | 3 | 9 |
|----|---|---|---|
| 14 | 4 | 7 | 13 |
| 2 | 8 | 11 | 1 |
| 6 | 12 | 15 | 5 |

503

601
| 4 | 5 | 6 | 6 |
|---|---|---|---|
| 5 | 5 | 5 | 6 |
| 5 | 5 | 6 | 5 |
| 5 | 6 | 5 | 4 |

602
| 5 | 15 | 12 | 6 |
|---|----|----|---|
| 1 | 11 | 8 | 2 |
| 13 | 7 | 4 | 14 |
| 9 | 3 | 0 | 10 |

603

CONTROLLER AND HALFTONE DOT SIGNAL GENERATING METHOD CAPABLE OF CONTROLLING GLOSSINESS OF IMAGE

CROSS-REFERENCE TO RELATED APPLICATIONS

This patent application is based on and claims priority pursuant to 35 U.S.C. §119 to Japanese Patent Application No. 2010-242032 filed on Oct. 28, 2010 in the Japanese Patent Office, Japanese Patent Application No. 2011-124067 filed on Jun. 2, 2011 in the Japanese Patent Office, and Japanese Patent Application No. 2011-221859 filed on Oct. 6, 2011 and their domestic priority claiming application filed in the Japanese Patent Office, the serial number of which is as yet unknown, the entire disclosure of each of which being hereby incorporated by reference herein.

FIELD OF THE INVENTION

The present invention relates to an image glossiness controller for controlling gloss of an image formed on media by an electrophotographic system, and an image forming apparatus that employs the image glossiness controller.

BACKGROUND OF THE INVENTION

In electrophotography, an image is produced by adhering colored powder material, such as toner, etc., to the image on a recording medium. As a result, however, a mirror gloss (JIS Z 8741, hereinafter simply referred to as gloss) of the image changes sometimes. That is, the gloss generally increases as the amount of toner attracted onto the image increases. In addition, the amount of toner attracted onto the image is not uniform but fluctuates by section. Specifically, the gloss increases at a solid image section and decreases at a halftone dot section. As a result, unintended uneven gloss appears, thereby degrading the quality of the image.

To solve such a problem, a clear, colorless toner (i.e., toner that does not affect color) may be utilized, as described, for example, in Japanese Patent No. 3,146,367 (JP-3146367-B) and Japanese Patent Application Laid Open No. H9-200551 (JP-H09-200551-A). Specifically, a prescribed amount of clear toner is adhered onto an image so that the total thickness of the toner layer, that is, the total amount of both yellow, magenta, cyan, and black (herein after simply referred to as YMCK color) toner and clear toner, is constant throughout the image. Accordingly, the gloss of the image can also be kept constant regardless of a reproduction color.

In Japanese Patent JP-3146367-B, it is assumed that image information at each of Y, M, C, K pixels has a prescribed analog value or a multilevel digital value greater than 256. Further, an amount of toner attracted to each of Y, M, C, K pixels on a sheet is assumed to have a prescribed analog value (i.e., a toner weight per unit area (e.g. $mg/cm^2$)). Similarly, image information at each clear pixel and the amount of clear toner attracted onto a sheet are each treated as analog quantities. Accordingly, the total amount of attracted Y, M, C, K color and clear toner can be kept constant without great difficulty.

However, a conventional electrophotographic apparatus or a commercial printer cannot directly reproduce a halftone image using halftone toner in accordance with halftone image information expressed as an analog value as described above. Therefore, a dither method is employed to apply binary processing (i.e., either adhering toner or not) and form a halftone dot per pixel, thereby virtually expressing the halftone.

The halftone dots have characteristics such as a number of screen lines, an angle of a screen, a shape of a screen, etc. The screen shape is either a dot or a line and the like, and this discussion assumes the former. In general, a fine halftone dot image is obtained when the number of screen lines increases (i.e., a thin line). However, if the screen line is too thin, uneven density or a similar problem occurs, thereby degrading image quality. Accordingly, the number of screen lines is set to range from about 140 lines/inch to about 200 lines/inch in accordance with the capabilities of the printing (screen) system. Further, to avoid creating a moiré image the screen angles of the component colors Y, M, C, and K are different for each component color such that an indigo or cyan plate (C) is 15 degrees, a magenta plate (M) is 75 degrees, a yellow plate (Y) is 0 degrees, and a black plate (K) is 45 degrees.

In an actual printing system, binary halftone dots of the component colors Y, M, C, and K are superimposed virtually at random in a halftone image region on the recording medium. However, when the total amount of toner is kept constant using the clear toner, a clear toner image signal sometimes becomes irregular or intermittent, and accordingly does not form fine, stable dots like the stable halftone dots of the component colors Y, M, C, and K. Consequently, the surface of the image cannot be completely smoothed, thereby causing uneven gloss and degrading image quality.

Further, when a clear toner is attracted onto a concavity in the image surface, the surface is flattened and a high degree of gloss can be achieved. At the same time, however, convexoconcavity, when the clear toner is attracted onto a convexity on the image surface, that convexoconcavity increases and accordingly the gloss decreases. Hence, the glossiness can be controlled if the clear toner is selectively attracted.

SUMMARY OF THE INVENTION

Accordingly, an object of the present invention is to provide a novel image glossiness controller employed in an electrophotographic system having a color toner image forming device. Such image glossiness controller includes three or more first halftone dot signal generators that convert three and more pieces of component color image information into three and more binary component color image signals using multiple first halftone dot characteristics, respectively. A main component color specifying unit to receive the three or more pieces of component color image information and identify one of the three or more component colors and output identification information thereof. One of the two or more component colors is specified when thickness of a toner layer thereof mostly changes among those of other at lest two remaining component colors when the toner layer is formed and fixed alone and having the greatest effect on a convexoconcavity of a multiple color image toner when the toner layer is formed and fixed together with at least one remaining color toner layer. A clear toner image information generator is provided to generate and output clear toner image information representing an amount of clear toner to be attracted onto respective three or more component color images per component color pixel. Three or more second halftone dot signal generators are provided to convert the clear toner image information into three or more binary clear toner image signals for the three or more component colors per component color pixel, respectively, using multiple second halftone dot characteristics. Each of the multiple second halftone dot characteristics has a reversed phase from each of the multiple first halftone dot characteristics of the corresponding component color. An image signal selecting unit is provided to receive the identification information and the three or more clear toner image signals and selects and outputs one of the three or more clear toner image signals to a printer controller in accordance with the identification information.

In another aspect, the main component color specifying unit includes a conversion table to store previously obtained characteristic of the amplitude of a convexoconcavity of a toner image per usage halftone dot type and per component color, and a maximum value component color specifying unit to receive from the conversion table and identify one of the at least two component colors causing the maximum amplitude, and further outputs an identification signal indicating the one of the three or more component colors as the identification information.

In yet another aspect, the main component color specifying unit identifies one of the three or more component colors as producing a maximum amplitude as having the greatest effect in accordance with an area rate of a halftone dot image per pixel of one of the three or more component colors (e.g., at a peak of around 50%).

In yet another aspect, the main component color specifying unit includes an identification signal temporarily storage memory composed of a line memory and a latch to temporarily store multiple identification signals each indicating one of the three or more component colors. An identification signal averaging unit is also provided to receive and average the multiple identification signals from the identification signal temporarily storage memory and outputs an averaged result.

In yet another aspect, the clear toner image information generator 14 generates the clear toner image information based on the image information of three or more component colors by calculating the following first to third formulas:

$$Clr=100-(C+M+Y+K)(Clr=0, \text{ when } Clr<0); \quad (1)$$

$$Clr=100\times(100-C)/100\times(100-M)/100\times(100-Y)/100\times(100-K)/100; \quad (2) \text{ and}$$

$$Clr=100-\max(C,M,Y,K), \quad (3)$$

wherein Clr represents an amount of the clear toner, and C to K each represents an amount of component color toner. A calculation manner selecting unit is provided to select one of the second and third formulas in accordance with a performance of the color electrophotographic system.

In yet another aspect, the first and second three or more halftone dot signal generators generate three or more binary component color image signals and three or more binary clear toner image signals using a dither method with multiple dither matrixes, respectively per component color pixel. One of the multiple dither matrixes generating the three or more binary clear toner image signals has a reversed phase reversed substantially by an angle of 180 degree from the other one of multiple dither matrixes generating the three or more binary component color image signals.

In yet another aspect, each of the multiple second halftone dot characteristics has one of substantially the same and reversed phases from that of each of the first halftone dot characteristics of the corresponding component color. An image surface treatment manner designating unit is provided to designate one of substantially the same and reversed phases of the each of the multiple second halftone dot characteristic based on a request from a user.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
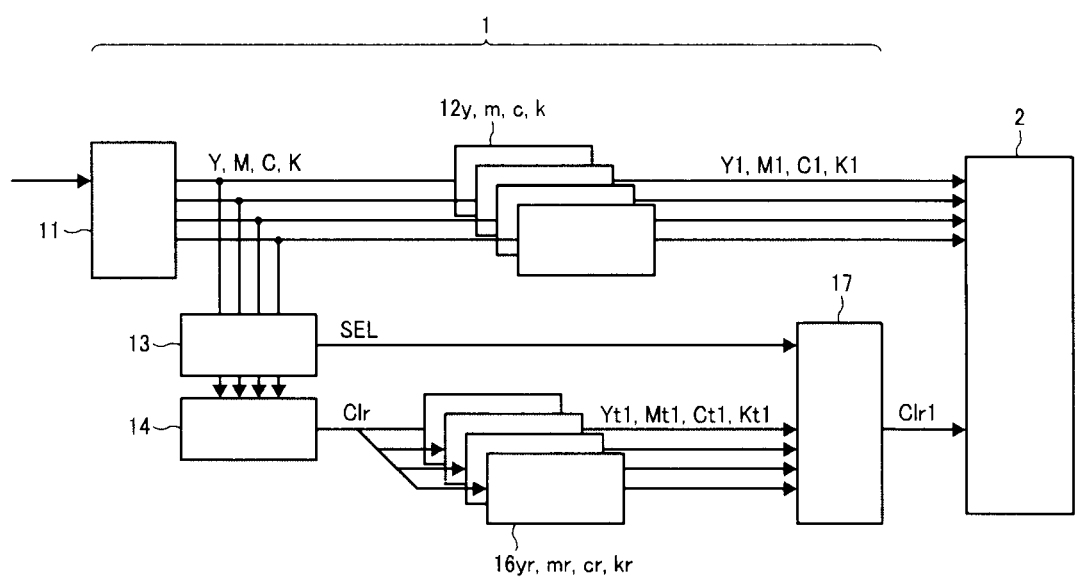
FIGS. 1A to 1C are block charts illustrating configurations of an electrophotographic system of an image forming apparatus according to one embodiment of the present invention and modifications thereof.

Referring now to the drawing, wherein like reference numerals designate identical or corresponding parts throughout several views, in particular in FIG. 1A, a first embodiment of an electrophotographic system is described. Initially, it is herein below premised that a dither method is employed to apply binary processing and form a halftone dot having a popular dot screen shape per pixel, so that the halftone can be virtually expressed. It is also premised that mirror gloss of an image is typically sixty degrees. As shown, the electrophotographic system is roughly separated into two parts of a printing controller 1 and a printer engine 2. The printing controller 1 includes a known raster image processing (RIP) unit 11, multiple halftone dot signal generators 12y, 12m, 12c, 12k of respective Y, M, C, K component colors, and a main component color specifying device 13. Also included in the printing controller 1 are a clear toner image information generator 14, multiple clear toner image clear toner image halftone dot signal generators 16(yt, mt, ct, kt), and a halftone dot signal selector 17. The RIP unit 11 converts a document produced by a user using a page description language (PDL) or the like into gradation sequence image information per pixel of YMCK four component color toner in accordance with a performance of the printer engine 2. The pixel has a size depending on a printing resolution, and is about 1/600 inch while density thereof is about 600 (pixel/inch), for example. The pixel is assumed to have a rectangular region having both sides of about 42.3 micrometer. Further, gradation sequence image information of the YMCK four component color toner has digital values of 8 bits/pixel per component color, totally 32 bits/pixel. These pieces of image information of Y, M, C, and K are inputted into the corresponding halftone dot signal generators (12y, 12m, 12c, 12k), respectively.

In each of the halftone dot signal generators (12y, 12m, 12c, 12k), the image information (Y, M, C, K) is converted into binary image signals (Y1, M1, C1, K1) per pixel using a dither method, and the conversion results are outputted therefrom and inputted into the printer engine 2. Subsequently, such gradation sequence image information is printed with halftone dots generated by using a prescribed dither matrix having a prescribed characteristic designated by the printer engine 2. Thus, the gradation sequence can be virtually expressed per pixel using binary information. Depending on a type of the printer engine 2, a pixel can be printed with multiple values using a prescribed known multilevel dither method. Anyway, when the printer engine finally executes printing based on such binary information, the gradation sequence can be similarly expressed.

In one embodiment of the present invention, a main component color specifying device 13 is provided to receive inputs of the image information of YMCK component color toner. The main component color specifying device 13 then specifies one of component colors of Y, M, C, and K per pixel, a convexoconcavity of a toner layer of which component color has greatest effect (i.e., greatest amplitude "d") on that of an image to be printed using the YMCK four component color toner particles in the pixels. The main component color specifying device 13 then outputs identification information of the component color as a signal SEL having two bits, for example.

Figure 2:
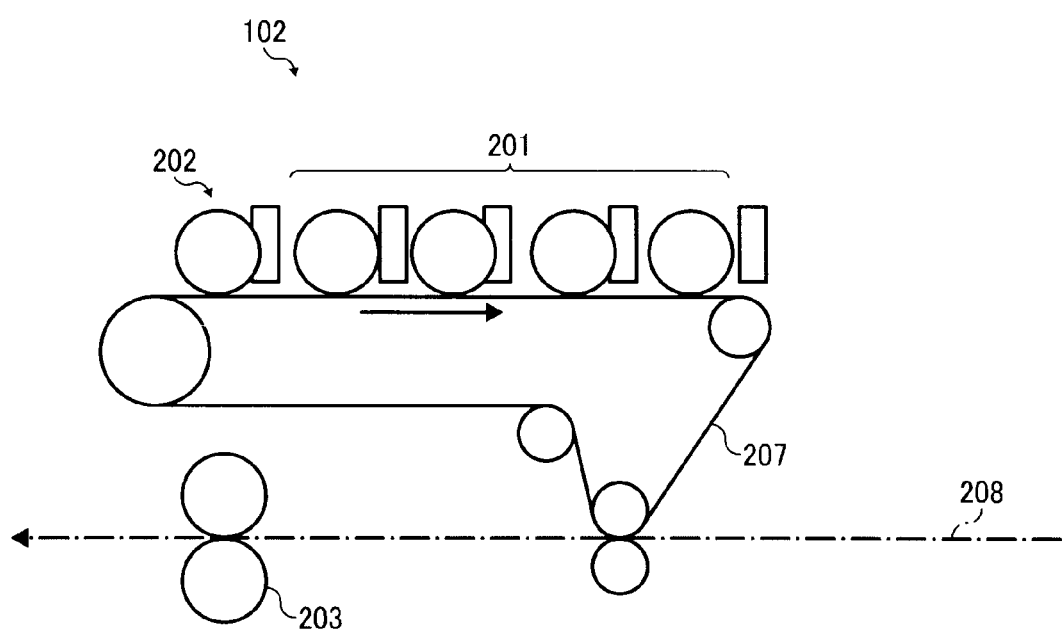
FIG. 2 schematically illustrates a configuration of a printer engine included in the image forming apparatus of FIG. 1A.

A clear toner image information generator 14 is also provided to receive inputs of the image information of YMCK four component color toner and calculate an amount of clear toner to be attracted onto the pixel based thereon. The clear toner image information generator 14 subsequently outputs a clear toner image information Clr as a calculation result. The clear toner image information Clr also has a gradation sequence with 8 bits per pixel as similar to that of Y, M, C, and K as described later more in detail. Multiple clear toner image halftone dot signal generators 16(*yt, mt, ct, kt*) have substantially the same configuration as the halftone dot signal generators 12(*y, m, c, k*) for the Y, M, C, K image information. Thus, the clear toner image clear toner image halftone dot signal generators 16(*yt, mt, ct, kt*) each receives an input of the clear toner image information Clr and outputs binary image information (yt1, mt1, ct1, kt1). However, a dither matrix included in each of the clear toner image clear toner image halftone dot signal generators 16(*yt, mt, ct, kt*) has a reversed pattern from that in the halftone dot signal generators 12(*y, m, c, k*) as described later more in detail. An halftone dot signal selector 17 is provided to receive inputs of the signal SEL and the image signals of Yt1, mt1, ct1, and kt1 from the main component color specifying device and the clear toner image clear toner image halftone dot signal generators 16(*yt, mt, ct, kt*), respectively. The halftone dot signal selector 17 subsequently selects one of image signals Yt1 to Kt1 corresponding to the component color specified by the signal SEL and outputs the same as an image signal Clr1 to the printer engine 2. Now, a configuration of the printer engine 2 is described with reference to FIG. 2. Binary toner image signals (Y1, M1, C1, K1) of the respective pixels of YMCK four component colors are inputted into a color toner image forming device 201 employing a known electrophotographic system. Subsequently, toner images of Y, M, C, and K are formed on an intermediate transfer belt 207 based on the toner image signals (Y1, M1, C1, K1), respectively. Further, the binary clear toner image signal Clr1 for each pixel is also inputted into the color toner image forming device 201, and a clear toner image is formed on the intermediate transfer belt 207 based on the clear toner image signals Clr1.

On an upstream side (i.e., a left side on the drawing), a clear toner image forming device 202 is provided, and accordingly, the clear toner image is initially formed on the intermediate transfer belt 207 in accordance with the clear toner image signals Clr1. Accordingly, a (YMCK) superimposed toner image is formed on a surface of a sheet passing through a sheet path toward the left side while the clear toner image is overlaid thereon. These (YMCK) superimposed toner image and the clear toner image are fixed onto the sheet by a fixing device 203 at once, thereby completing the printing.

These color toner image forming device 201, the clear toner image forming device 202, the intermediate transfer belt 207, and the fixing device 203 have substantially the same configuration and operation as those as described in Japanese Patent JP-3,146,367-B except for employment of the intermediate transfer belt 207 of an indirect transfer type. Thus, the clear toner image forming device 202 is arranged most upstream on the transfer belt 207.

Figure 3A:
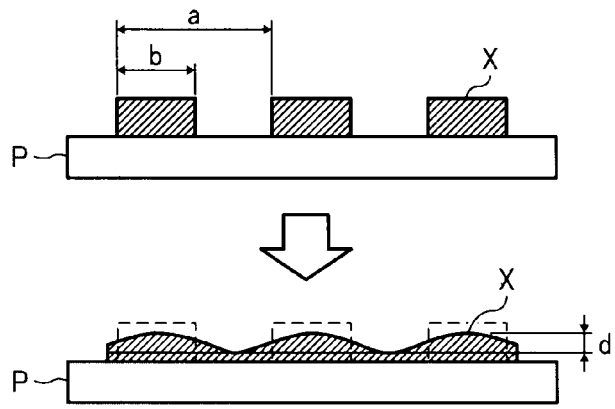
FIGS. 3A to 3C are cross sectional views each illustrating transition of a cross section of a component color halftone dot image having a different density from each other before and after a fixing process generating a different amplitude of convexoconcavity thereof from each other after the fixing process.
Figure 3B:
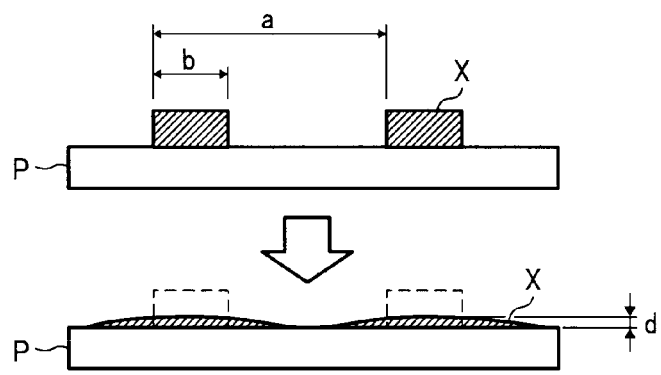
Figure 3C:
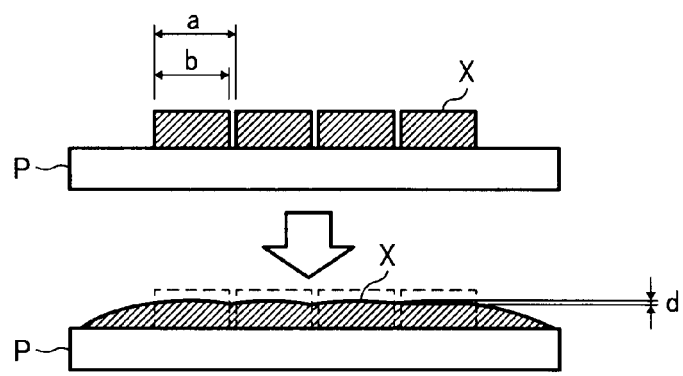

Now, a main component color specifying device 13 is described more in detail with reference to FIGS. 3A to 3C, 5A and 5B. Initially, a sectional view of a component color halftone image formed on a sheet 301 is described. Specifically, as shown in FIG. 3A, a halftone dot image 302 is formed on a high gloss sheet 301 by adhering a prescribed amount of the yellow toner onto a solid image thereon with density of about 0.4 mg/cm$^2$. An upper drawing illustrates an imaginary image signal Y1. Whereas, a lower drawing is a cross sectional view illustrating a result of practical printing of the yellow toner image in the printer engine 2, wherein "a" indicates a halftone dot pitch (e.g., 141 lines per inch) and "b" indicates a diameter of the halftone dot. When the above-described halftone dot signal generators 12(*y, m, c, k*) are used without changing a condition in the printer engine, image information is equivalent to the halftone dot area rate R, obtained by dividing the total area of halftone dots on a sheet by that of the sheet, in a uniform halftone image region (i.e., image information is locally constant) in general.

Further, although the image signal Y1 is binary and is assumed to ideally form a clear halftone dot as shown in the upper drawing, a practically printed image becomes unclear. Because, a convexoconcavity having amplitude "d" (micrometer) appears on the surface of the image at a frequency of the numbers of halftone dots when practically printed. Such amplitude "d" decreases when the pitch of halftone dots becomes narrower, and accordingly an image becomes darker, because neighboring dots stop melting down with each other as shown FIGS. 3B and 3C.

Now, a relation between a halftone dot area rate R and amplitude "d" of a convexoconcavity when a halftone dot is formed only using yellow toner is described with reference to FIG. 4. The amplitude "d" is measured using a known laser optical distance meter by excluding a high frequency component equal to or less than ¼. Specifically, the equality R=0(%) represents a convexoconcavity on a substrate of a coat sheet and is equal to or less than 1 micrometer. Whereas the equality R=100(%) represents a convexoconcavity of a solid image region and is equal to or less than 2 micrometer. Between the above-described two regions (i.e., a halftone region), the amplitude "d" increases with a peak at around where the equality R ranges from about 30(%) to about 50(%). Since it varies depending on characteristic of a halftone dot, convexoconcavity amplitude characteristic is previously measured per halftone dot to be used for each of component colors (Y, M, C, K).

Figure 5A:
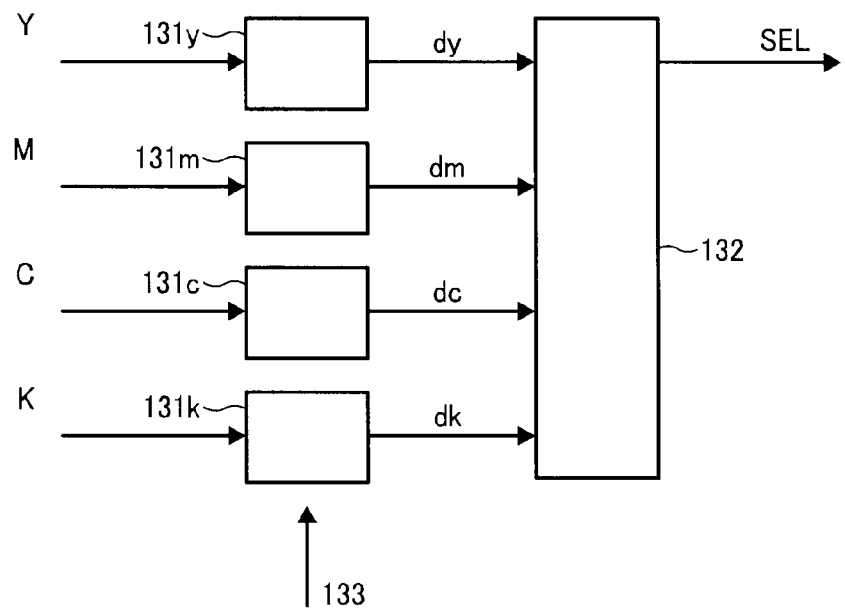
FIGS. 5A and 5B are block charts each illustrating a configuration of a main component color specifying device.

Now, the main component color specifying device 13 is described more in detail with reference to FIG. 5A. The image information Y, M, C, K of respective component colors are inputted into tables 131 (131*y*, 131*m*, 131*c*, 131*k*) storing previously obtained characteristics of the convexoconcavity amplitude "d" of the component colors Y, M, C, K, respectively. Then, convexoconcavity amplitudes dy, dm, dc, dk are outputted. Subsequently, a maximum value determination (identifying) device 132 identifies the largest convexoconcavity amplitude "d" among those of dy, dm, dc, dk and outputs one of them as a two bit identification signal SEL indicating a component color of the largest convexoconcavity amplitude. In such a situation, a single large conversion table may be formed including the tables 131(y, m, c, k) for a halftone dot to be used. Any way, a selection signal 133 may be inputted to the conversion tables to select one of tables 131(y, m, c, k) as shown. Thus, the conversion table receives the image information (Y, M, C, K) and outputs the signal SEL as a determination result.

The halftone region of the image is composed of superposition of Y, M, C, K component color images including the amplitudes dy, dm, dc, dk of convexoconcavity, respectively. Thus, it is apparent that a component color image having the largest amplitude among dy, dm, dc, dk has great effect on a convexoconcavity on a surface of a full-color image of the superposition.

Figure 4:
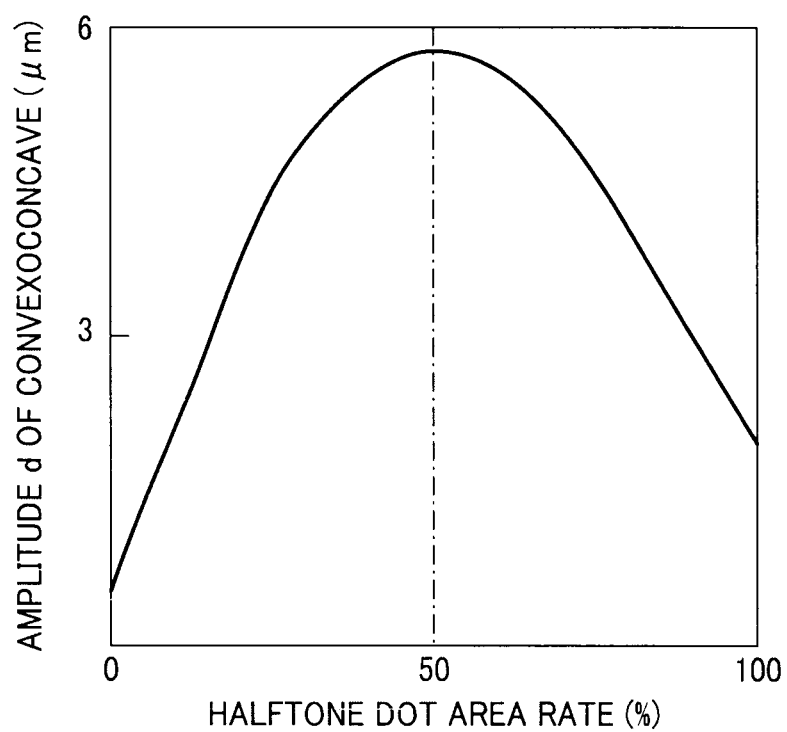
FIG. 4 is a graph showing a relation between a halftone dot area rate and a convexoconcavity amplitude when a yellow color halftone dot is typically formed and fixed.
Figure 5B:
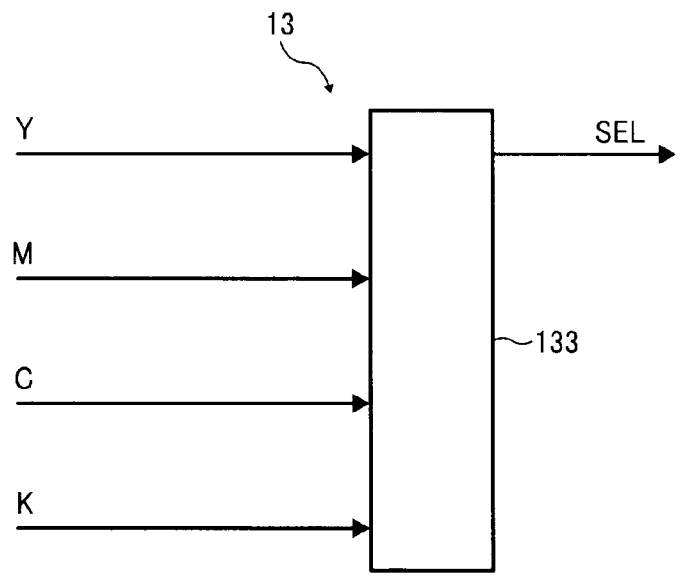

Further, it is already known that many characteristics of convexoconcavity amplitude of a halftone dot have a peak at around where the area rate R is about 40 to about 60 as shown in FIG. 4. Therefore, when a characteristic of convexoconcavity amplitude of a halftone dot is unknown, one of component colors Y, M, C, K having the peak of the area rate R at around 50% may be regarded as having the largest amplitude. Then, in a modification of the main component color specifying device 13, one of component colors Y, M, C, K having the peak of the area rate R at around 50% is selected based on the above-described previous knowledge as shown in FIG. 5B. Any way, the same advantage can be obtained.

Now, the clear toner image information generator 14 of FIG. 1A is described more in detail. As described earlier, the clear toner image information generator 14 receives the information of YMCK four component color toner images, calculates an amount of clear toner to be attracted onto each of the pixels of YMCK, and outputs a clear toner image information Clr per pixel as a calculation result.

According to JP-3146367-B, the below-described relation has been known;

$Clr=100-(C+M+Y+K)$ or, ($Clr=0$ in case $Clr<0$) (First formula), wherein Clr, C, M, Y, and K represent an amount of clear toner and that of respective component color toner particles (hereinafter the same).

However, when image information Clr is calculated based on the above-described relation, and clear toner and component color toner image information are outputted to the printer engine 2 by applying a prescribed dither method, for example, with the halftone dot signal generator 12y for the "y" component color image information, the halftone image is not sufficiently smoothed. Then, an amount of the clear toner indicated by the clear toner information Clr is preferably increased in the halftone image region using the below listed modified formulas.

That is, as a multiplication type, background exposure rates of respective component colors are multiplied as follows;

$Clr=100\times(100-C)/100\times(100-M)/100\times(100-Y)/100\times(100-K)/100$ (Second formula).

Otherwise, as a maximum area rate typical type, it is assumed that a halftone dot of a component color having the largest area rate controls smoothness of an image surface as calculated below;

$Clr=100-\max(C,M,Y,K)$ (Third formula).

Thus, the greater amount of clear toner is stacked in the halftone image region when the third formula is used than when the second formula is used. Such second and third formulas are selected by a calculation manner selector, not shown, in accordance with a performance of the printer engine 2.

Now, the clear toner image clear toner image halftone dot signal generators 16(yt, mt, ct, kt) of FIG. 1A are described more in detail. Each of dither matrixes included in the clear toner image clear toner image halftone dot signal generators 16 has a reversed pattern from that of the corresponding halftone dot signal generators 12(y, m, c, k). Therefore, the halftone dot signal generators 12(y, m, c, k) are initially described.

Figure 6:
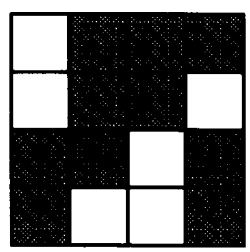
FIG. 6 illustrates a halftone dot generator.
Figure 6:
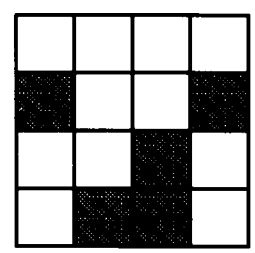

First, a known dither method is described with reference to FIG. 6. Although, a halftone dot signal generator 12y handling image information Y is typically described herein below, the other remaining halftone dot signal generators 12m to 12k have substantially the same configuration and accordingly operate substantially in the same manner.

In the drawing, yellow image information is assumed to have an image region 501 vertically and horizontally having 4×4 pixels at a prescribed portion for the purpose of explanation. Therefore, the other image region of the image information Y is processed substantially in the same manner as the image region 501. Since a compact dither matrix 502 vertically and horizontally have 4×4 pixels is utilized, the image information Y is premised only to include 17 levels in the image region 501 from 0 to 16, wherein 0 corresponds a background, and 16, solid image, respectively. Since the pixel is 600 dpi, an element in the dither matrix 502 is a dot type in that the number of screen lines per inch is 210 and a screen angle is 45 degree. Thus, a binary image signal Y1 shown in an image region 503 is obtained by applying a rule to the image information Y of the image region 501 in that if a value of a pixel of the image region 501 is greater than that of a corresponding element in the dither matrix 502, the pixel is given a black (i.e., 1). Otherwise, the pixel is given a white (i.e., 0).

Such a prescribed value is previously stored in a memory, and is read therefrom upon receiving an input of the image information Y by regarding it as an address.

Figure 7:
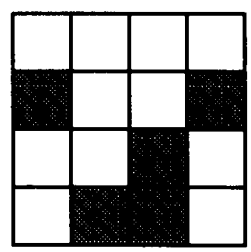
FIG. 7 illustrates another halftone dot generator.
Figure 7:
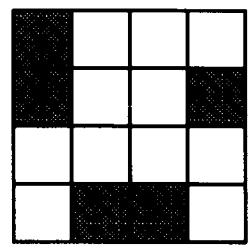
Figure 7:
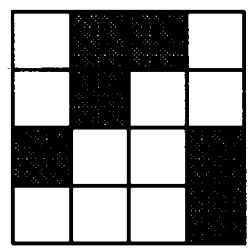
Figure 7:
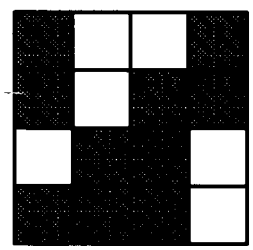
Figure 7:
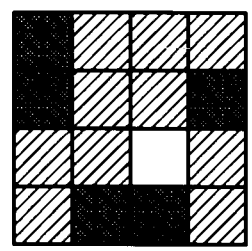

Now, an operation of the clear toner image clear toner image halftone dot signal generators 16(y, m, c, k) of one embodiment of the present invention is described with reference to FIG. 7 based only on a typical example of a halftone dot signal generator 16y handling yellow image information. An operation of the remaining clear toner image clear toner image halftone dot signal generators 16(m, c, k) is, however, executed substantially in the same manner.

An image region both vertically and horizontally having 4×4 pixels at a prescribed portion of a clear toner image information Clr is assumed as a clear toner image region 601 and is typically described. However, the other image region in the clear toner image information Clr is processed substantially in the same manner as the clear toner image region 601. Since a dither matrix 602 is made compact as both vertically and horizontally having 4×4 pixels for the sake of simplicity, the clear toner image information Clr only includes 17 levels in the clear toner image region 601 from 0 to 16 levels, wherein 0 represents a background and 16, solid image, respectively. The dither matrix 602 is obtained by reversing the dither matrix 502 by calculating the below described formula:

Element of dither matrix 602=15−(Corresponding element of dither matrix 502).

Consequently, a phase of the thus generated halftone dots becomes reversed by an angle of 180 degree and a calculated binary clear toner image signal Clr1 is obtained as shown in the image region 603.

As understood when the image regions 503 and 603 are compared with each other, an image surface obtained by superimposing these image regions becomes smooth, because a convexoconcavity on the image surface generated in the image region 603 appropriately fit into the reversed convexoconcavity generated in the image region 503.

Now, the halftone dot signal selector 17 of FIG. 1A is described more in detail. The halftone dot signal selector 17 receives an input of the signal SEL from the main component color specifying device 13 and that of image signals yt1, mt1, ct1, and kt1. The selector subsequently selects one of the image signals yt1, mt1, ct1, and kt1 of a component color designated by the signal SEL. The selector then outputs the thus selected one of the image signals yt1, mt1, ct1, and kt1 to the printer engine 2 as an image signal Clr1. Even though the halftone dot signal selector 17 is arranged finally, substantially the same advantage can be obtained.

The clear toner image clear toner image halftone dot signal generators 16(yt, mt, ct, kt) may be constituted in one unit as a halftone dot signal generator 16, in which multiple matrixes 602 are installed corresponding to the respective clear toner image clear toner image halftone dot signal generators 16(yt, mt, ct, kt) to be selected by the above-described signal SEL. As described earlier, when the halftone dot signal generator 16 is achieved by a memory, the signal SEL may be added to an address to simplify the configuration.

Hence, according to this first embodiment, since a component color that has great effect on a convexoconcavity on an surface of a halftone image region expressed by YMCK superimposed image information, which especially requires a smoothness, is specified, and clear toner of a halftone dot, a phase of which is reversed from that of the halftone dot image signal of the specified component color, is attracted thereto, a halftone full-color image of these superposition can highly precisely be smoothed. Further, since the clear toner image has a halftone dot generated by using a prescribed stable halftone dot characteristic as used in YMCK component color image formations, the clear toner is also highly precisely attracted, and accordingly a smooth and high quality image can be obtained avoiding uneven gloss thereon.

Figure 1B:
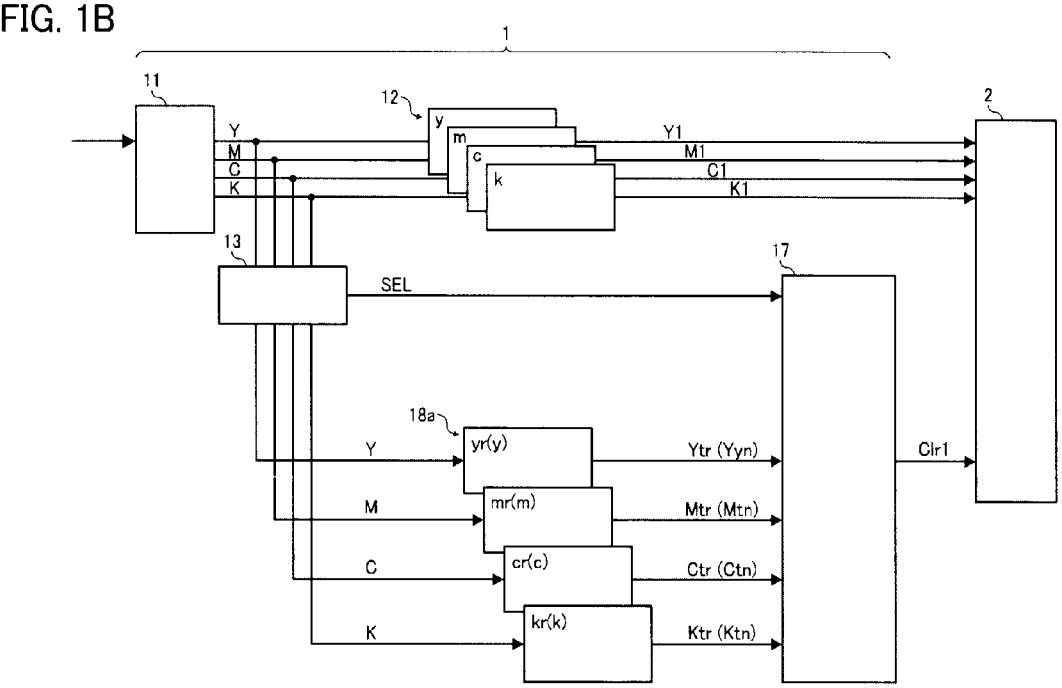
Figure 1C:
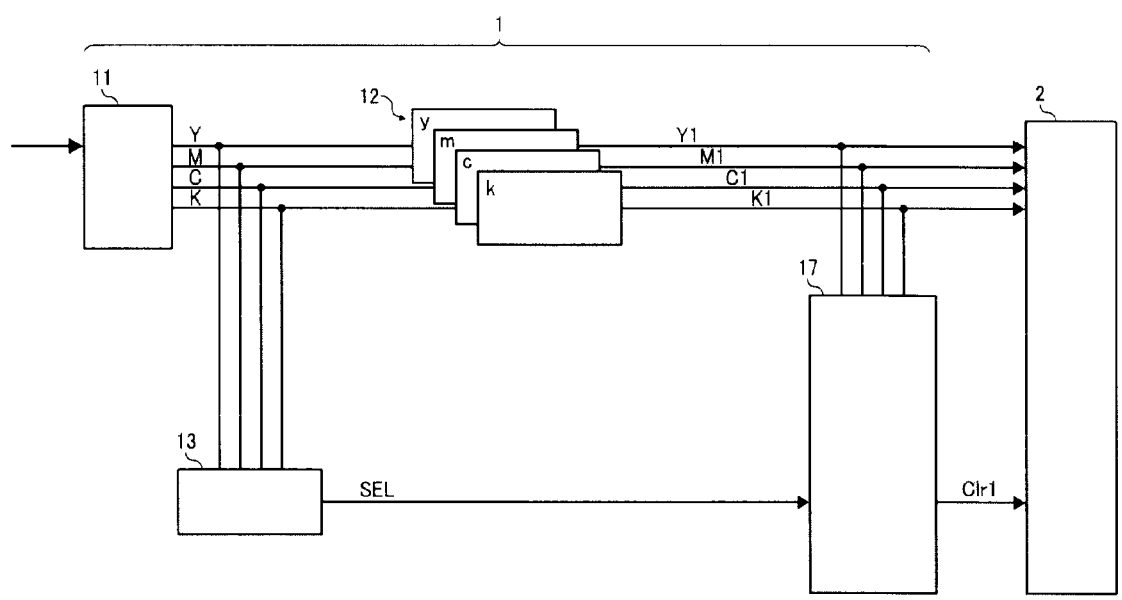

Now, a first modification of the first embodiment of an image forming apparatus is described with reference to FIG. 1B. An image forming apparatus of this embodiment has substantially the same configuration and operates substantially in the same manner as the first embodiment, but modifies the clear toner image halftone dot generating and outputting device 14. Specifically, the a clear toner image information generator 14 is omitted. More specifically, the halftone dot signal generators 18a (y, yr, m, mr, c, cr, k, and kr) generate binary halftone dot signals (ytr, ytn, mtr, mtn, ctr, ctn, ktr, and ktn), respectively, each having a second halftone dot characteristic using dither coefficient matrixes corresponding to respective component colors of yellow to black directly based on gradation sequence information of pixels of the raster images of the respective component colors, which are directly obtained from the RIP unit after component color separation. Such a reversed halftone dot characteristic of each of the binary halftone dot signals (yr, mr, cr, and kr) has a reversed phase from that of the first halftone dot characteristic and are inputted to the halftone dot signal selector 17. Such a first halftone dot characteristic of each of the binary halftone dot signals (y, m, c, and k) has the same phase as that of the first halftone dot characteristic and are generated using the outputs Y1 to K1 of the halftone dot signal generators 12(y, m, c, k) and can be inputted to the halftone dot signal selector 17 as shown in FIG. 1C.

Now, a second modification of the first embodiment is described with reference to FIGS. 8A and 8B. The second modification has substantially the same configuration and operates substantially in the same manner as the first embodiment except for an interior configuration of the main component color specifying device 13. Specifically, instead of outputting the identification signal SEL of a component color as is as in the first embodiment, multiple identification signals SEL are averaged using an averaging device and an averaging result is then outputted and utilized in the later step.

Figure 8A:
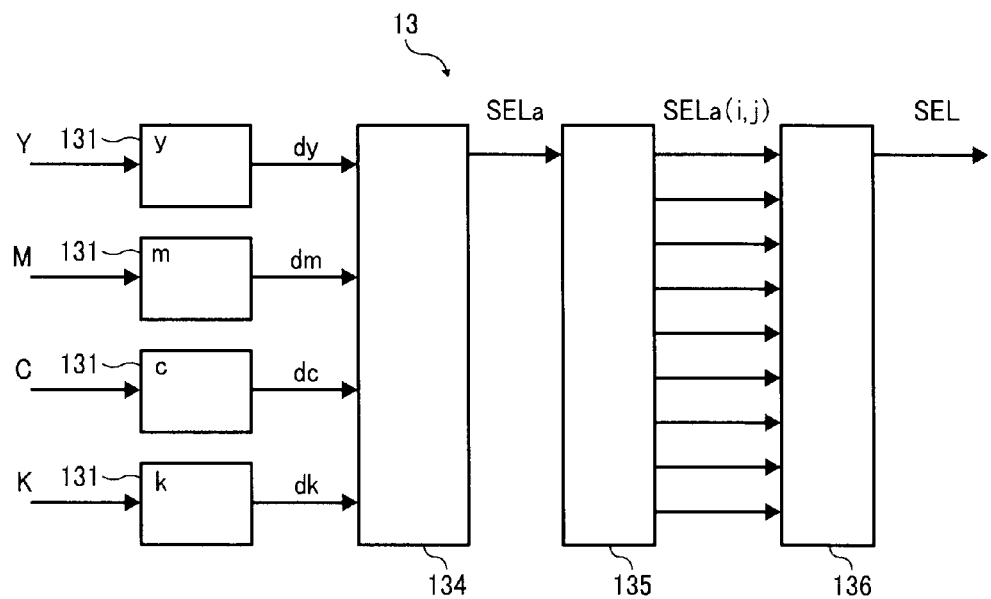
FIGS. 8A and 8B are block charts each schematically illustrating a configuration of another main component color specifying device.
Figure 8B:
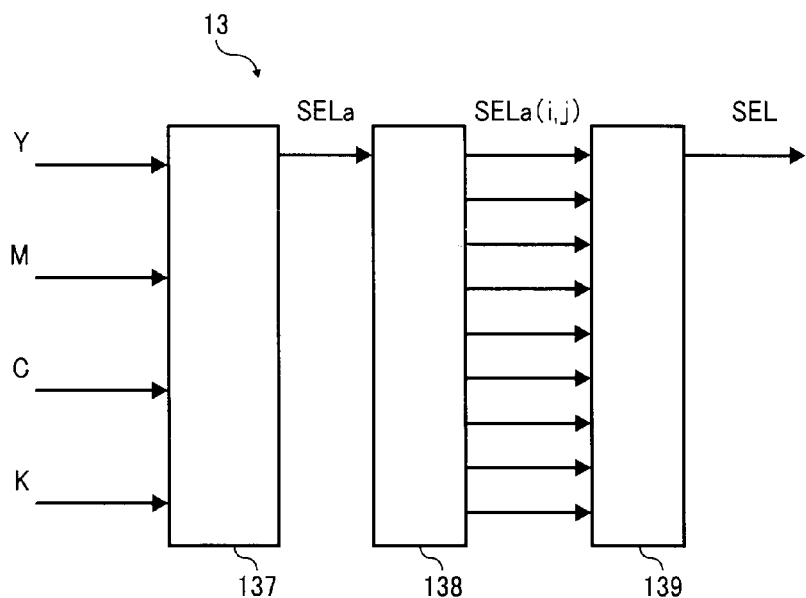

Specifically, as shown in FIG. 8A, the signal SEL is stored per pixel in a signal SEL temporary storage memory 135 composed of a known line memory and a latch. When a signal SEL of a pixel to be printed is represented by SEL(0, 0), the signal SEL temporary storage memory 135 outputs the signal (SEL 0, 0) and its surrounding signals (SELi, SELj) in a block to a known signal SELa averaging device 136, wherein i=±1, ±2, ... ±max, and j=±1, ±2, ... ±max, wherein "i" represents an order number of pixels in a scanning direction, and "j" represents that in a sub scanning direction. The signal SEL averaging device 136 subsequently averages these signals (SELi, SELj) and outputs an averaged value as an average signal SELa. A modified main component color specifying device 13 of FIG. 8B is similarly operated using a signal SEL generated based on one of component colors Y, M, C, K having the peak of the area rate R at around 50% as shown in FIG. 5B.

Hence, according to the second embodiment, even though amplitudes of convexoconcavity of dy, dm, dc, and dk of the YMCK component color image information are close to each other, and accordingly the maximum value thereof and the signal SEL frequently change in a halftone image region, which is expressed by YMCK component color image information pieces and especially requiring a smoothness, a clear toner image becomes stable maintaining the above-described advantages. Specifically, since a signal SEL of a pixel having great effect on a convexoconcavity of a superimposed halftone image to be printed and those of its surroundings are averaged, the signal SEL is not frequently changed. As a result, halftone dot printing of the clear toner can be stabilized, and a smooth image is obtained.

A size and density of the pixel is not limited to that as described above, and an optional size and density can be employed. The dither matrix and halftone dot can employ the other characteristics, and composition of the clear toner can be optional.

The configuration of the above-described printer engine is not limited to that as described above, and an optional type can be employed. An order of tandem arrangement of the respective color image formation units can be optional. Further, the other system can be employed than the tandem system. A direct transfer system can also be employed instead of the indirect type as described above. Instead of four component colors, three component color system can be employed.

Figure 9A:
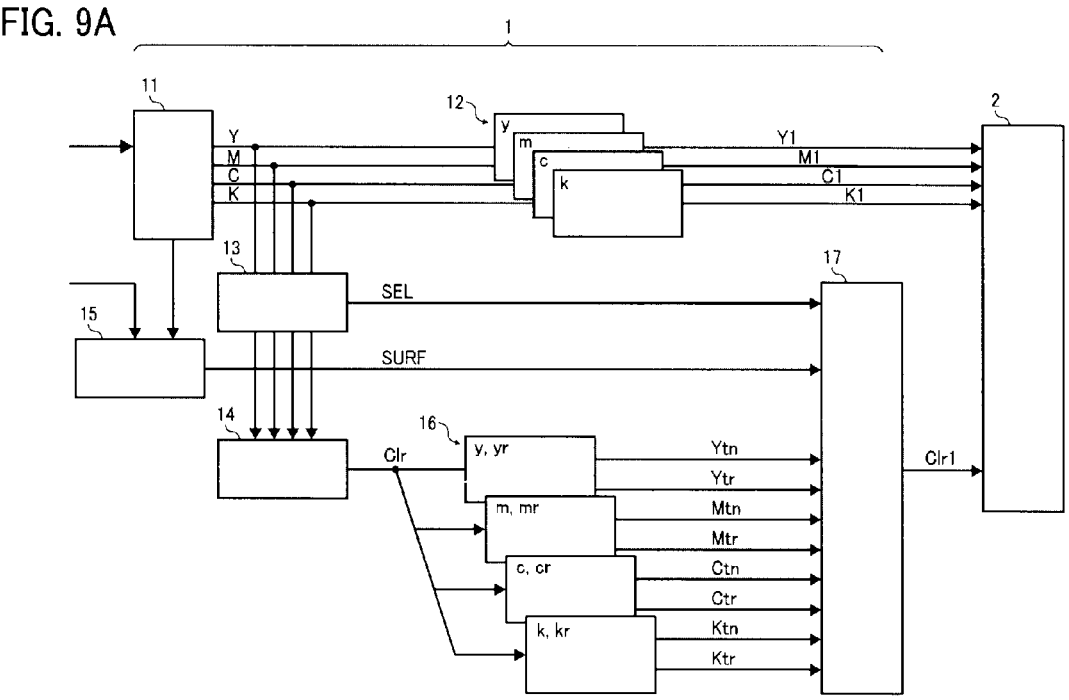
FIGS. 9A to 9C illustrate configurations of another electrophotographic system of an image forming apparatus according to another embodiment of the present invention and modifications thereof.

Now, a second embodiment of the present invention is described with reference to FIG. 9A. As shown, this embodiment has substantially the same configuration and thereby executes substantially the same operation as the first embodiment except for image surface treatment as described below.

Specifically, an image surface treatment manner designation unit 15 is provided to designate a type of high or low gloss treatment of an image on a sheet in accordance with a selection of a user. Specifically, an image surface treatment manner designation signal SURF instructing one of these treatments as described later in detail is inputted to a halftone dot signal selecting unit 17 in accordance with the selection.

Thus, the multiple clear toner image clear toner image halftone dot signal generators 16(*y, yr, m, mr, c, cr, k*, and *kr*) for yellow to black component colors and the halftone dot signal selecting unit 17 collectively form a halftone dot generation and outputting unit in this embodiment.

These clear toner image clear toner image halftone dot signal generators 16(*y, yr, m, mr, c, cr, k*, and *kr*) generate binary halftone dot signals (Ytn, Ytr, Mtn, Mtr, Ctn, Ctr, Ktn, and Ktr) of a second halftone dot characteristic based on gradation sequence information of a raster image for a clear toner image generated by a clear toner image information generator 14 per pixel using respective dither coefficient matrixes for yellow to black component colors.

Specifically, such a second halftone dot characteristic includes two types. The first type is binary halftone dot signal (Ytn, Mtn, Ctn, and Ktn) having substantially the same phase as the first halftone dot characteristic. Whereas, the second type has substantially a reversed phase (reversed by an angle of 180 degree, for example) from that of the first halftone dot characteristic.

Now, one example of conversion manners of converting image information into a binary halftone dot signal using one of the clear toner image clear toner image halftone dot signal generators 16(*y, yr, m, mr, c, cr, k*, and *kr*) is described with reference to FIG. 7. As shown, image information (e.g. black) of an image region 901 is binarized to a halftone image signal 903 using a dither matrix 902 in substantially the same manner as executed by the halftone dot signal generators 12(*y, m, c, k*) generating the color image information as described earlier with reference to FIG. 6. Such binary halftone dot signals are again generated for the entire image region of a (e.g. black) raster image using a dither coefficient matrix in this embodiment.

Further, clear toner image processing is also similarly executed in this embodiment as in the first embodiment. Specifically, 131 denotes a gradation sequence information in a prescribed region of a raster image for a clear toner image generated by the clear toner image information generator 14 corresponding to the gradation sequence information 901, and has four pixels on each of vertical and lateral sides thereof, thereby 17 levels of from 0 to 16 level for example. The level "0" represents a sheet ground, while the level "16" represents a solid section thereon.

Calculation of each of pieces of the gradation sequence information is executed per pixel such that the number "100" in the first to third formulas is replaced with "16" as a solid image, and each level of each of gradation sequence information (i.e., from 0 to 16 level, totally 17 levels) in a pixel of a (black) raster image is substituted to the first formula, and subtraction calculation is executed assuming that gradation sequence information in a pixel of each of the other component colors (e.g. yellow to cyan) is absent.

A dither matrix 132 has coefficients obtained by reversing those of the dither matrix 902. Specifically, each of the coefficients of the former dither matrix 132 is subtracted from the level "15" with each coefficient of the latter dither matrix 902. For example, the coefficient "5" at the left upper corner of the dither matrix 132 is subtracted from the level "15" with that of "10" written at the left upper corner of the dither matrix 902.

Accordingly, when a halftone dot signal is generated based on the gradation sequence information 901 of a prescribed section of the black raster image having 4 pixels on both vertical and lateral sides using the dither matrix 132, a phase of the halftone dot signal is reversed by an angle of 180 degree from that of 903, which is obtained by the dither matrix 902.

Consequently, one or more black sections of the halftone signal 802 (i.e., one or more convex portions of toner) fit into one or more white sections of the halftone signal 903 (i.e., one or more convex sections of toner) as shown in a dither matrix 803, so that a convexoconcavity is reduced and the surface is smoothed increasing gloss thereof.

Further, the halftone dot signal generator 16 generates a binary halftone dot signal (Ktr) 133 based on the gradation sequence information 131 of the raster image for the clear toner image, which is generated in the clear toner image information generator 14 using the dither matrix 132 having the reversed characteristic as described above. Apparently, the dither matrix 703 is almost similar to that of 802, and accordingly, the black sections of the halftone dot signal 133 fit into the white sections of that of 903. As a result, the convexoconcavity on the image surface decreases while increasing the smoothness and glossiness thereof.

Further, the halftone dot signal generator 16 also generates a binary halftone dot signal Ktn 801 based on the gradation sequence information 131 of the raster image for clear toner image using a dither matrix having substantially the same characteristic as the dither matrix 902 having the first halftone dot characteristic. As apparent from the drawing, the binary halftone dot signal 801 is almost similar to that of 903. Therefore, the black sections of 801 overly the black sections of 903 and the convexoconcavity of the image surface increases thereby decreasing glossiness when overlapped with each other.

Accordingly, the clear toner image halftone dot signal generators 16 (Y, M, C, K) generate eight binary halftone dot signals Ytn, mtn, ctn, ktn, and Ytr, mtr, ctr, and ktr based on the gradation sequence information of the raster image for the clear toner image using the above-described dither matrixes having same and reversed phases from the dither matrixes having the first halftone dot characteristic to selectively produce images of high and low glosses in the fixing process.

Further, the above-described designation signal SURF outputted from the image surface treatment manner designation unit 15 has one-bit that designates either a dither matrix having the same or reversed phase from the first halftone dot characteristic.

Among these multiple binary halftone dot signals (Ytn, Ytr, Mtn, Mtr, Ctn, Ctr, Ktn, and Ktr) generated in the clear toner image halftone dot signal generators 16, the halftone dot signal selector 17 selects and outputs one of them in accordance with both the color information SEL and the designation signal SURF transmitted from the image surface treatment manner designation unit 15 to the printer engine as a halftone dot signal Clr1 per pixel of the raster image for the clear toner image.

For example, upon receiving the color information SEL indicating the black and the surface treatment manner designation signal SURF indicating high gloss from the image surface treatment manner designation unit 15, the halftone dot signal selector 17 selects and outputs a binary halftone dot signal Ktr, for example, among these eight binary halftone dot signals (Ytn, Ytr, Mtn, Mtr, Ctn, Ctr, and Ktn) to the printer engine 3 as a halftone dot signal Clr1 to generate a clear toner image.

Hence, the halftone dot generating and outputting device for clear toner image use generates raster images of respective component colors y, m, c, k and generates clear toner images based on gradation sequence information thereof per pixel.

The clear toner image use halftone dot generation and outputting device then generates and outputs a halftone dot signal for forming a clear toner image based on the raster images of respective component colors y, m, c, k, in accordance with a color information SEL which color has the greatest effect on formation of a convexoconcavity of a surface of a full-color image per pixel, and a surface treatment manner designation signal SURF that indicates either high or low gloss of the image surface.

The gradation sequence determination unit identifies a component color having a gradation sequence information closest to a center of the gradation sequence level among those of pixels of raster images of respective component colors located at the same coordinates. For example, when the gradation sequence information is composed of sixteen levels of from 0 to 15 level, a component color of a pixel having gradation sequence information closest to "8" is identified. The third main component color specifying unit then specifies the component color of gradation sequence information identified by the gradation sequence determination unit as a main color of a halftone dot that has greatest effect on formation of a convexoconcavity of a full-color toner image.

The main component color specifying device 13 of the third embodiment is advantageous when amplitude "d" of the convexoconcavity is not largely different between component colors in pixels having the same coordinates with a simple structure.

Figure 9B:
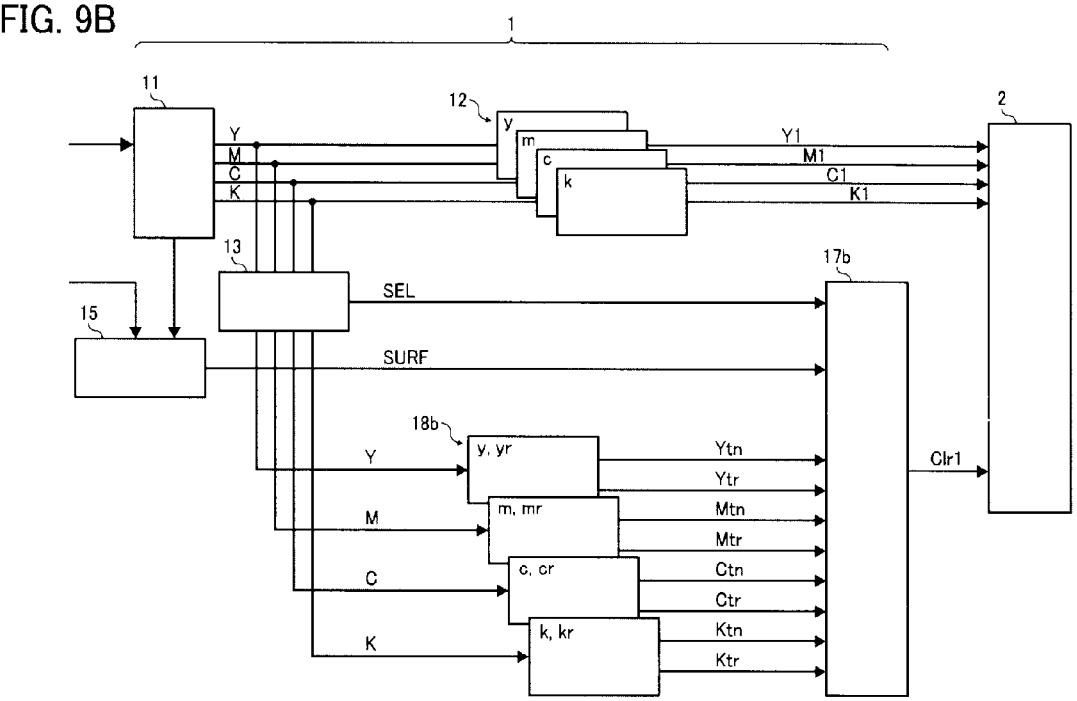

Now, a first modification of the second embodiment of an image forming apparatus is described with reference to FIG. 9B. An image forming apparatus of this embodiment has substantially the same configuration and operates substantially in the same manner as the second embodiment, but modifies the clear toner image halftone dot generating and outputting device 14. Specifically, the clear toner image halftone dot generating and outputting device 14 generating a raster image for clear toner image processing is omitted. However, a unit of third halftone dot signal generators 18b (y, yr, m, mr, c, cr, k, and kr) is provided as a clear toner image halftone dot generating and outputting device to generate clear toner image halftone dot signals having the first and second characteristic for respective component colors of yellow to black. Further, a halftone dot signal selector 17b are provided as shown.

Figure 9C:
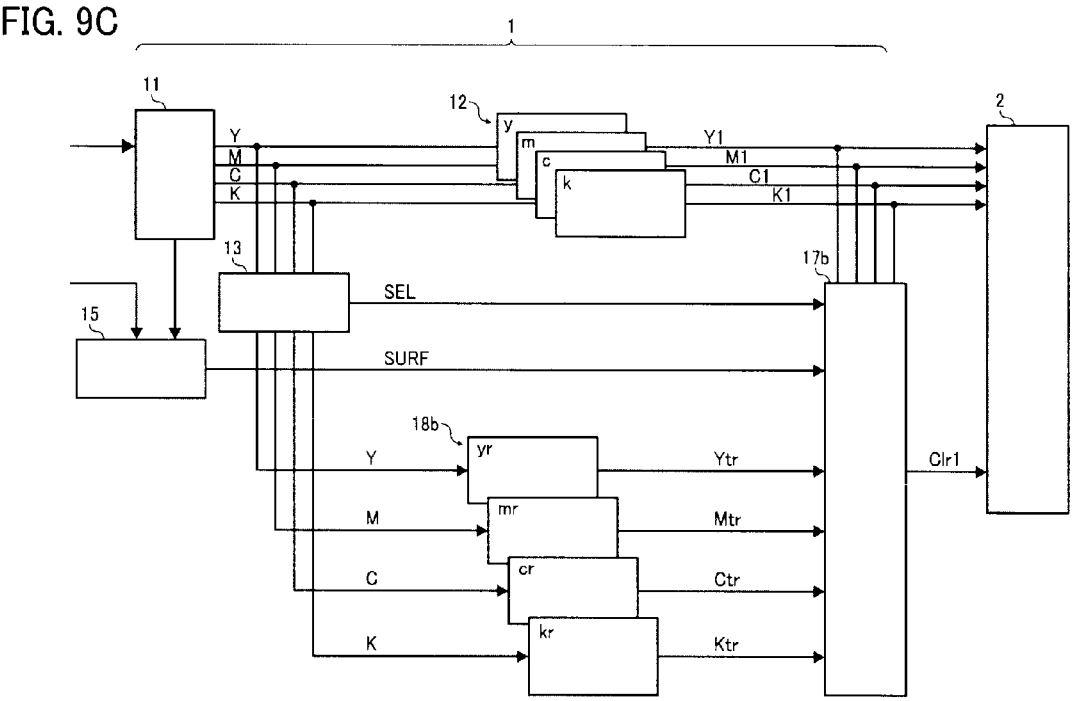

Specifically, the third halftone dot signal generators 18b (y, yr, m, mr, c, cr, k, and kr) generate binary halftone dot signals (ytr, ytn, mtr, mtn, ctr, ctn, ktr, and ktn), respectively, each having a second halftone dot characteristic using dither coefficient matrixes corresponding to respective component colors of yellow to black directly based on gradation sequence information of pixels of the raster images of the respective component colors, which are obtained in the RIP unit after component color separation. Such a second halftone dot characteristic of each of the binary halftone dot signals (yr, mr, cr, and kr) has a reversed phase from that of the first halftone dot characteristic and are inputted to the halftone dot signal selector 17b. Such a second halftone dot characteristic of each of the binary halftone dot signals (y, m, c, and k) has the same phase as that of the first halftone dot characteristic and are inputted to the halftone dot signal selector 17b. A signal Clr1 is selected and is outputted in accordance with the selection signal and the surface treatment signal SURF in the same mentioned as described above. In yet another modification of the second embodiment, the third halftone dot signal generators 18b (yr, mr, cr, and kr) only generate binary halftone dot clear toner signals (ytr, mtr, ctr, and ktr) in the same manner as in the first modification as shown in FIG. 9C. Specifically, each of the binary halftone dot clear toner image signals (y, m, c, and k) having the same phase as that of the first halftone dot characteristic are generated based on the outputs Y1 to K1 from the halftone dot signal generators 12(y, m, c, and k) as shown.

Numerous additional modifications and variations of the present invention are possible in light of the above teachings. It is therefore to be understood that within the scope of the appended claims, the present invention may be practiced otherwise than as specifically described herein.

What is claimed is:

1. An image glossiness controller employed in a color electrophotographic system that forms a multiple color image by superimposing at least two component color toner particles, said image glossiness controller comprising:
at least two first halftone dot signal generators to convert at least two pieces of component color image information into at least two binary component color image signals per component color pixel using at least two first halftone dot characteristics, respectively;
a main component color specifying unit to receive the at least two pieces of component color image information and identify one of the at least two component colors and output identification information thereof, a toner layer of said one of the at least two component colors mostly changes its thickness among those of the other at least one remaining component color on the same coordinate when formed and fixed alone having the greatest effect on a convexoconcavity of a multiple color toner layer when formed and fixed together with the at least one remaining component color toner layers;
a clear toner image information generator to generate and output clear toner image information based on the inputs of the at least two pieces of component color image information per component color pixel, said clear toner image information representing an amount of clear toner to be attracted onto respective of the at least two component color images, said clear toner is clear and colorless;
at least two second halftone dot signal generators to convert the clear toner image information into at least two binary clear toner image signals for the at least two component colors per component color pixel, respectively, using at least two second halftone dot characteristics each of said at least two second halftone dot characteristics having a reversed phase from each of the first halftone dot characteristics of the corresponding component color; and
an image signal selecting unit to receive the identification information and the at least two clear toner image signals from the main component color specifying unit and the at least two second halftone dot signal generators, respectively, said image signal selecting unit selecting and outputting one of the at least two clear toner image signals to a printer controller corresponding to the identification information, said printer controller controlling component color toner and clear toner image formation.

2. The image glossiness controller as claimed in claim 1, wherein said main component color specifying unit includes:
a conversion table to store previously obtained characteristic of the amplitude of a convexoconcavity of a toner image per usage halftone dot type and per component color; and
a maximum value component color specifying unit to receive from the conversion table and identify one of the at least two component colors causing the maximum amplitude, said maximum value component color specifying unit outputting an identification signal indicating the one of the at least two component colors as the identification information.

3. The image glossiness controller as claimed in claim 1, wherein said main component color specifying unit identifies one of the at least two component colors as producing a maximum amplitude having the greatest effect, an area rate of a halftone dot image per pixel of said one of the at least two component colors having a peak at around 50%.

4. The image glossiness controller as claimed in claim 1, wherein said main component color specifying unit includes:
- a conversion table to store previously obtained characteristic of the amplitude of a convexoconcavity of a toner image per usage halftone dot type and per component color;
- a maximum value component color specifying unit to receive from the conversion table and identify one of the at least two component colors causing the maximum amplitude, said maximum value component color specifying unit outputting an identification signal indicating the one of the at least two component colors as the identification information;
- an identification signal temporarily storage memory to temporarily store at least two identification signals each indicating one of the at least two component colors, said identification signal temporarily storage memory composed of a line memory and a latch; and
- an identification signal averaging unit to average the at least two identification signals outputted from the identification signal temporarily storage memory and output an averaged result.

5. The image glossiness controller as claimed in claim 1, wherein said clear toner image information generator generates the clear toner image information based on the image information of at least two component colors by calculating the following first to third formulas:

$$Clr=100-(C+M+Y+K)(Clr=0, \text{ when } Clr<0); \quad (1)$$

$$Clr=100\times(100-C)/100\times(100-M)/100\times(100-Y)/100\times(100-K)/100; \quad (2) \text{ and}$$

$$Clr=100-\max(C,M,Y,K), \quad (3)$$

wherein Clr represents an amount of the clear toner, and C to K each represents an amount of component color toner; and
a calculation manner selecting unit to select one of the second and third formulas in accordance with a performance of the color electrophotographic system.

6. The image glossiness controller as claimed in claim 1, wherein said first and second at least two halftone dot signal generators generate the at least two binary component color image signals and the at least two binary clear toner image signals using a dither method with at least two dither matrixes, respectively, one of said at least two dither matrixes generating the at least two binary clear toner image signals is reversed substantially by an angle of 180 degree from the other one of said at least two dither matrixes generating the at least two binary component color image signals.

7. An image glossiness controller employed in a color electrophotographic system that forms a multiple color image by superimposing at least two component color toner particles, said image glossiness controller comprising:
- at least two first halftone dot signal generators to convert at least two pieces of component color image information into at least two binary component color image signals per component color pixel using at least two first halftone dot characteristics, respectively;
- a main component color specifying unit to receive the at least two pieces of component color image information and identify one of the at least two component colors and output identification information thereof, a toner layer of said one of the at least two component colors mostly changes its thickness among those of the other at least one remaining component colors when formed and fixed alone having the greatest effect on a convexoconcavity of a multiple color toner layer when formed and fixed together with the at least one remaining component color toner layers;
- a clear toner image information generator to generate and output clear toner image information based on the inputs of the at least two pieces of component color image information per component color pixel, said clear toner image information representing an amount of clear toner to be attracted onto respective of the at least two component color images, said clear toner is clear and colorless;
- at least two second halftone dot signal generators to convert the clear toner image information into at least two binary clear toner image signals for the at least two component colors per component color pixel, respectively, using at least two second halftone dot characteristics each of said at least two second halftone dot characteristics having one of substantially the same and reversed phases from each of the first halftone dot characteristics of the corresponding component color; and
- an image surface treatment manner designating unit to designate one of substantially the same and opposite phases of the each of the at least second halftone dot characteristic based on a request from a user.

8. The image glossiness controller as claimed in claim 7, wherein said main component color specifying unit includes:
- a conversion table to store previously obtained characteristic of the amplitude of a convexoconcavity of a toner image per usage halftone dot type and per component color; and
- a maximum value component color specifying unit to receive from the conversion table and identify one of the at least two component colors causing the maximum amplitude, said maximum value component color specifying unit outputting an identification signal indicating the one of the at least two component colors as the identification information.

9. The image glossiness controller as claimed in claim 7, wherein said main component color specifying unit identifies one of the at least two component colors as producing a maximum amplitude having the greatest effect, an area rate of a halftone dot image per pixel of said one of the at least two component colors having a peak at around 50%.

10. The image glossiness controller as claimed in claim 7, wherein said main component color specifying unit includes:
- a conversion table to store previously obtained characteristic of the amplitude of a convexoconcavity of a toner image per usage halftone dot type and component color;
- a maximum value component color specifying unit to receive from the conversion table and identify one of the at least two component colors causing the maximum amplitude, said maximum value component color specifying unit outputting an identification signal indicating the one of the at least two component colors as the identification information;
- an identification signal temporarily storage memory to temporarily store at least two identification signals each indicating one of the at least two component colors, said identification signal temporarily storage memory composed of a line memory and a latch; and an identification signal averaging unit to average the at least two identification signals outputted from the identification signal temporarily storage memory and output an averaged result.

11. The image glossiness controller as claimed in claim 7, wherein said clear toner image information generator generates the clear toner image information based on the image information of at least two component colors by calculating the following first to third formulas:

$$Clr=100-(C+M+Y+K)(Clr=0, \text{ when } Clr<0); \quad (1)$$

$$Clr=100\times(100-C)/100\times(100-M)/100\times(100-Y)/100\times(100-K)/100; \quad (2) \text{ and}$$

$$Clr=100-\max(C,M,Y,K), \quad (3)$$

wherein Clr represents an amount of the clear toner, and C to K each represents an amount of component color toner; and a calculation manner selecting unit to select one of the second and third formulas in accordance with a performance of the color electrophotographic system.

12. The image glossiness controller as claimed in claim 7, wherein said first and second at least two halftone dot signal generators generate the at least two binary component color image signals and the at least two binary clear toner image signals using a dither method with at least two dither matrixes, respectively, one of said at least two dither matrixes generating the at least two binary clear toner image signals is reversed substantially by an angle of 180 degree from the other one of said at least two dither matrixes generating the at least two binary component color image signals.

13. A method of generating a halftone dot signal in a color electrophotographic system that forms a multiple color image by superimposing at least two component color toner particles, said method comprising the steps of:
converting at least two pieces of component color image information into at least two binary component color image signals per component color pixel using at least two first halftone dot characteristics, respectively;
receiving the at least two pieces of component color image information;
specifying one of the at least two component colors and outputting identification information thereof, a toner layer of said one of the at least two component colors mostly changes its thickness among those of at least one remaining component colors on the same coordinates when the toner layer is formed and fixed alone having the greatest effect on a convexoconcavity of a multiple color toner layer when formed and fixed together with the at least one remaining component color toner layers;
generating and outputting clear toner image information based on the inputs of the at least two pieces of component color image information per component color pixel, said clear toner image information representing an amount of clear toner to be attracted onto respective of the at least two component color images, said clear toner is clear and colorless;
converting the clear toner image information into at least two binary clear toner image signals for the at least two component colors per component color pixel, respectively, using at least two second halftone dot characteristics each of said at least two second halftone dot characteristics substantially having a reversed phase from each of the first halftone dot characteristics of the corresponding component color;
receiving the identification information and the at least two clear toner image signals; and
selecting and outputting one of the at least two clear toner image signals to a printer controller corresponding to the identification information, said printer controller controlling component color toner and clear toner image formation.

14. The method as claimed in claim 13, said step of specifying one of the at least two component colors includes the sub steps of:
storing previously obtained characteristic of the amplitude of a convexoconcavity of a toner image per usage halftone dot type and per component color;
receiving from the conversion table and identifying one of the at least two component colors causing the maximum amplitude; and
outputting an identification signal indicating the one of the at least two component colors as the identification information.

15. The method of as claimed in claim 13, wherein said step of specifying one of the at least two component colors includes the sub step of:
regarding one of said at least two component colors as having the greatest effect when it has an area rate of a halftone dot image having a peak at around 50% per pixel.

16. The method as claimed in claim 13, wherein said step of specifying one of the at least two component colors includes the sub steps of:
storing previously obtained characteristic of the amplitude of a convexoconcavity of a toner image per usage halftone dot type and per component color;
receiving from the conversion table and identifying one of the at least two component colors causing the maximum amplitude;
specifying and outputting an identification signal indicating the one of the at least two component colors as the identification information;
temporarily storing at least two identification signals each indicating one of the at least two component colors; and
averaging the at least two identification signals outputted from the identification signal temporarily storage memory and outputting an averaged result.

17. The method as claimed in claim 13, wherein said step of generating the clear toner image information includes the sub steps of:
calculating the following first to third formulas:

$$Clr=100-(C+M+Y+K)(Clr=0, \text{ when } Clr<0); \quad (1)$$

$$Clr=100\times(100-C)/100\times(100-M)/100\times(100-Y)/100\times(100-K)/100; \quad (2) \text{ and}$$

$$Clr=100-\max(C,M,Y,K), \quad (3)$$

wherein Clr represents an amount of the clear toner, and C to K each represents an amount of component color toner; and
selecting one of the second and third formulas in accordance with a performance of the color electrophotographic system.

18. The method as claimed in claim 13, wherein said step of generating the at least two binary component color image signals and the at least two binary clear toner image signals includes the sub step of:
using a dither method with at least two dither matrixes, wherein one of said at least two dither matrixes generating the at least two binary clear toner image signals is reversed substantially by an angle of 180 degree from the other one of said at least two dither matrixes generating the at least two binary component color image signals.

* * * * *